US012613886B2

(12) United States Patent (10) Patent No.: US 12,613,886 B2
Ahmad et al. (45) Date of Patent: Apr. 28, 2026

(54) GROUP GENERATION APPARATUS AND GROUP DETERMINATION METHOD

(71) Applicant: Hitachi Vantara, Ltd., Yokohama (JP)

(72) Inventors: Avais Ahmad, Tokyo (JP); Shinichi Hayashi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/816,066

(22) Filed: Aug. 27, 2024

(65) Prior Publication Data

US 2025/0315444 A1 Oct. 9, 2025

(30) Foreign Application Priority Data

Apr. 3, 2024 (JP) ................................ 2024-060228

(51) Int. Cl.
G06F 16/27 (2019.01)
G06F 16/23 (2019.01)
G06F 16/901 (2019.01)
(52) U.S. Cl.
CPC ........ G06F 16/275 (2019.01); G06F 16/2365 (2019.01); G06F 16/2379 (2019.01); G06F 16/27 (2019.01); G06F 16/9024 (2019.01)
(58) Field of Classification Search
CPC ............. G06F 11/1662; G06F 11/2076; G06F 11/2082; G06F 16/27; G06F 16/275; G06F 2201/82; G06F 2201/84; G06F 16/2365; G06F 16/9024; G06F 3/0647
See application file for complete search history.

(56) References Cited

U.S. PATENT DOCUMENTS

| | | | |
|---|---|---|---|
| 11,275,765 B2 | 3/2022 | Chen et al. | |
| 2016/0269481 A1* | 9/2016 | Holt | G06F 3/065 |
| 2023/0179435 A1* | 6/2023 | Heinecke | H04L 9/3297 |
| | | | 380/28 |
| 2024/0061754 A1* | 2/2024 | Chen | G06F 16/28 |
| 2025/0259041 A1* | 8/2025 | Crabtree | G06N 3/042 |

* cited by examiner

*Primary Examiner* — Marcin R Filipczyk
(74) *Attorney, Agent, or Firm* — MATTINGLY & MALUR, PC

(57) ABSTRACT

A group generation apparatus is a group generation apparatus that determines a consistency group for providing consistency to replication processing from a first site including a plurality of volumes to a second site including a plurality of volumes, the group generation apparatus including a group determination unit that forms one or more first groups that are groups of volumes at the first site based on a relationship of distributed transactions at the first site, forms one or more second groups that are groups of volumes at the second site based on a relationship of distributed transactions at the second site, specifies a correspondence relationship between the first group and the second group, and includes the first group and the second group that correspond to each other based on the specified correspondence relationship in the same consistency group.

4 Claims, 10 Drawing Sheets

DATA TABLE

1100

DISTRIBUTED TRANSACTION SET LIST

| TRANSACTION ID | SERVICE ID | LOCATION |
|---|---|---|
| T1 | S1, S2 | LOCAL |
| T2 | S3 | LOCAL |
| T3 | S1, S2 | REMOTE |
| : | : | |

(1110) (1120) (1130)

1200

VOLUME SERVICE RELATIONSHIP LIST

| SERVICE NAME | SERVICE ID | VOLUME CONNECTION DESTINATION | LOCATION | POD ID |
|---|---|---|---|---|
| MS1 | S1 | Vol 1 | REMOTE | P1 |
| MS2 | S2 | Vol 2 | LOCAL | P2 |
| MS3 | S3 | Vol 3、 Vol 4 | LOCAL | P3 |
| : | : | : | | |

(1210) (1220) (1230) (1240) (1250)

1300

DISTRIBUTED TRANSACTION GRAPH

| GRAPH ID | NODE ID | POSITION | POD ID | SERVICE ID |
|---|---|---|---|---|
| G1 | N1 | LOCAL | P1 | S1 |
| G2 | N2 | REMOTE | P2 | S4 |
| G1 | N3 | LOCAL | P3 | S1 |
| | : | | | |

(1310) (1320) (1330) (1340) (1350)

DATA TABLE — 1000

ASSOCIATION LIST — 1400

| TRANSMISSION SOURCE NODE ID (1410) | TRANSMISSION DESTINATION NODE ID (1420) |
|---|---|
| N1 | N3 |
| N2 | N4 |
| : | : |

CONSISTENCY GROUP SET — 1500

| TRANSACTION ID (1510) | SERVICE NAME (1520) |
|---|---|
| T1 | MS 1、MS2 |
| T2 | MS 3 |
| T3 | MS 4 |
| : | : |

REPLICATION LIST — 1600

| TOTAL CTG ID (1690) | LOCAL CTG ID (1610) | REMOTE CTG ID (1620) | LOCAL VOLUME (1630) | REMOTE VOLUME (1640) | REPLICATION (1650) |
|---|---|---|---|---|---|
| C1 | L1 | R3 | V1, V2 | V5, V6 | YES |
| C2 | L2 | R4 | V3, V4 | V7, V8 | NO |
| | : | : | | | |

START

S31 — SPECIFY ALL SERVICE AND PODS

S32 — GROUP PODS BASED ON RELATIONSHIP OF DISTRIBUTED TRANSACTION

S33 — SPECIFY VOLUMES MOUNTED TO PODS AND GENERATE VOLUME SERVICE RELATIONSHIP LIST

S34 — SPECIFY MIRROR OF EASH SERVICE OF REMOTE SITE

S35 — SPECIFY CORRESPONDENCE BETWEEN LOCAL CTG AND REMOTE CTG AND GENERATE REPLICATION LIST

END

Figure 9:
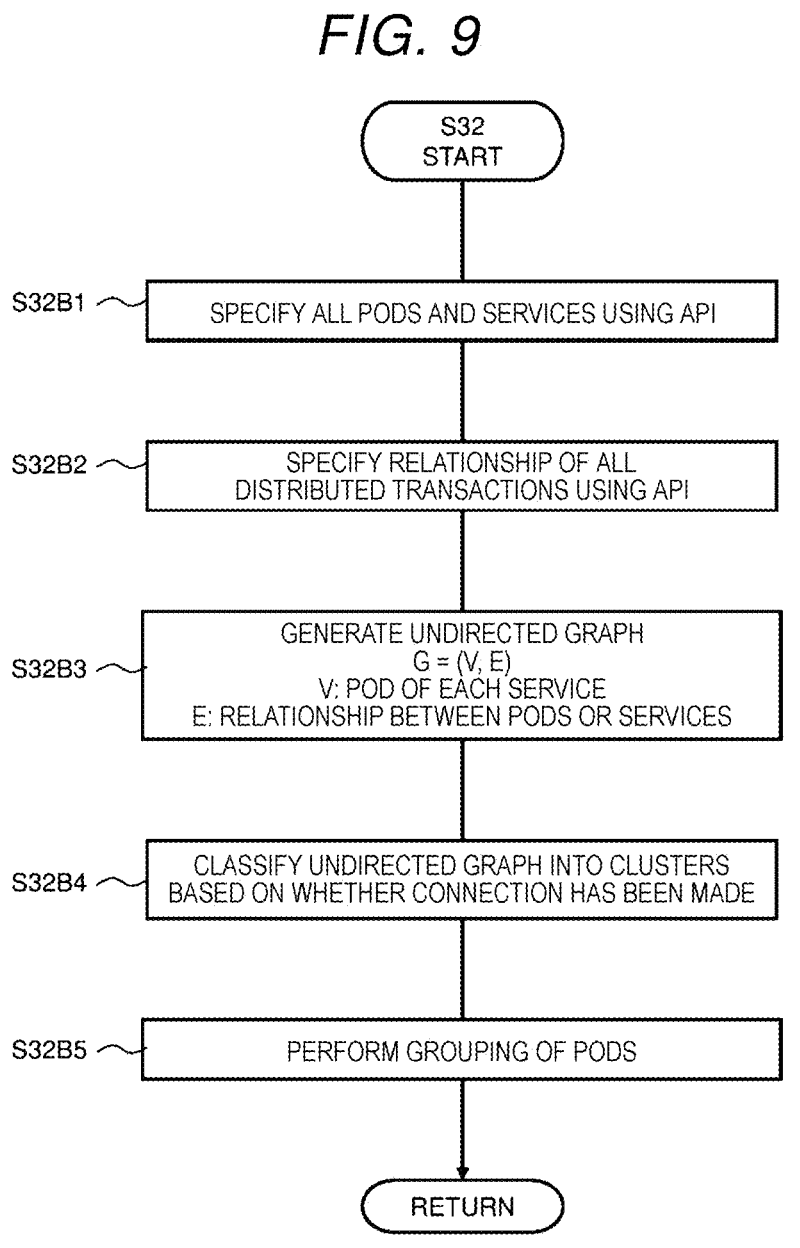

S32
START

S32B1 — SPECIFY ALL PODS AND SERVICES USING API

S32B2 — SPECIFY RELATIONSHIP OF ALL
DISTRIBUTED TRANSACTIONS USING API

S32B3 — GENERATE UNDIRECTED GRAPH
$G = (V, E)$
V: POD OF EACH SERVICE
E: RELATIONSHIP BETWEEN PODS OR SERVICES

S32B4 — CLASSIFY UNDIRECTED GRAPH INTO CLUSTERS
BASED ON WHETHER CONNECTION HAS BEEN MADE

S32B5 — PERFORM GROUPING OF PODS

RETURN

| TOTAL CTG ID | LOCAL CTG ID | REMOTE CTG ID | LOCAL VOLUME | REMOTE VOLUME | REPLICATION |
|---|---|---|---|---|---|
| C1 | L1 | R3 | V1, V2 | V5, V6 | ☑ |
| C2 | L2 | R4 | V3, V4 | V7, V8 | ☐ |
| | : | : | | | |

GROUP GENERATION APPARATUS AND GROUP DETERMINATION METHOD

CROSS-REFERENCE TO RELATED APPLICATION

The present application claims priority from Japanese application JP2024-060228, filed on Apr. 3, 2024, the content of which is hereby incorporated by reference into this application.

BACKGROUND OF THE INVENTION

1. Field of the Invention

The present invention relates to a group generation apparatus and a group determination method.

2. Description of Related Art

Replication processing is known as one of backup processing in the field of storage. U.S. Pat. No. 11,275,765B discloses an apparatus including at least one processing device including a processor coupled to a memory. The at least one processing device is configured to identify a storage volume to be added to a first consistency group of a first synchronous replication session between a first storage system and a second storage system in an active-active configuration, create a second synchronous replication session for the added storage volume between the first storage system and the second storage system, and merge the first and second synchronous replication sessions in response to one or more designated criteria. The second synchronous replication session is exemplarily configured to be completely independent of the first synchronous replication session. Merging the first and second synchronous replication sessions in response to one or more designated criteria exemplarily includes merging the first and second synchronous replication sessions in response to the second synchronous replication session reaching a designated steady state.

SUMMARY OF THE INVENTION

A group generation apparatus according to a first aspect of the present invention is a group generation apparatus that determines a consistency group for providing consistency to replication processing from a first site including a plurality of volumes to a second site including a plurality of volumes, the group generation apparatus including a group determination unit that forms one or more first groups that are groups of volumes at the first site based on a relationship of distributed transactions at the first site, forms one or more second groups that are groups of volumes at the second site based on a relationship of distributed transactions at the second site, specifies a correspondence relationship between the first group and the second group, and includes the first group and the second group that correspond to each other based on the specified correspondence relationship in the same consistency group.

A group determination method according to a second aspect of the present invention is a group determination method of determining a consistency group for providing consistency to replication processing from a first site including a plurality of volumes to a second site including a plurality of volumes, the group generation method including forming one or more first groups that are groups of volumes at the first site based on a relationship of distributed transactions at the first site, forming one or more second groups that are groups of volumes at the second site based on a relationship of distributed transactions at the second site, specifying a correspondence relationship between the first group and the second group, and including the first group and the second group that correspond to each other based on the specified correspondence relationship in the same consistency group.

According to the invention, a consistency group for providing consistency to a backup of a volume related to a distributed transaction can be automatically determined.

BRIEF DESCRIPTION OF THE DRAWINGS

FIG. 4 is a diagram showing an example of a distributed transaction set list, a volume service relationship list, and a distributed transaction graph included in a data table;

FIG. 8 is a diagram showing an example of an undirected graph;

FIG. 9 is a flowchart showing detailed processing when using an API in step S32 of FIG. 6.

DESCRIPTION OF EMBODIMENTS

First Embodiment

Hereinafter, a first embodiment of a data synchronization system will be described with reference to FIGS. 1 to 10.

Figure 1:
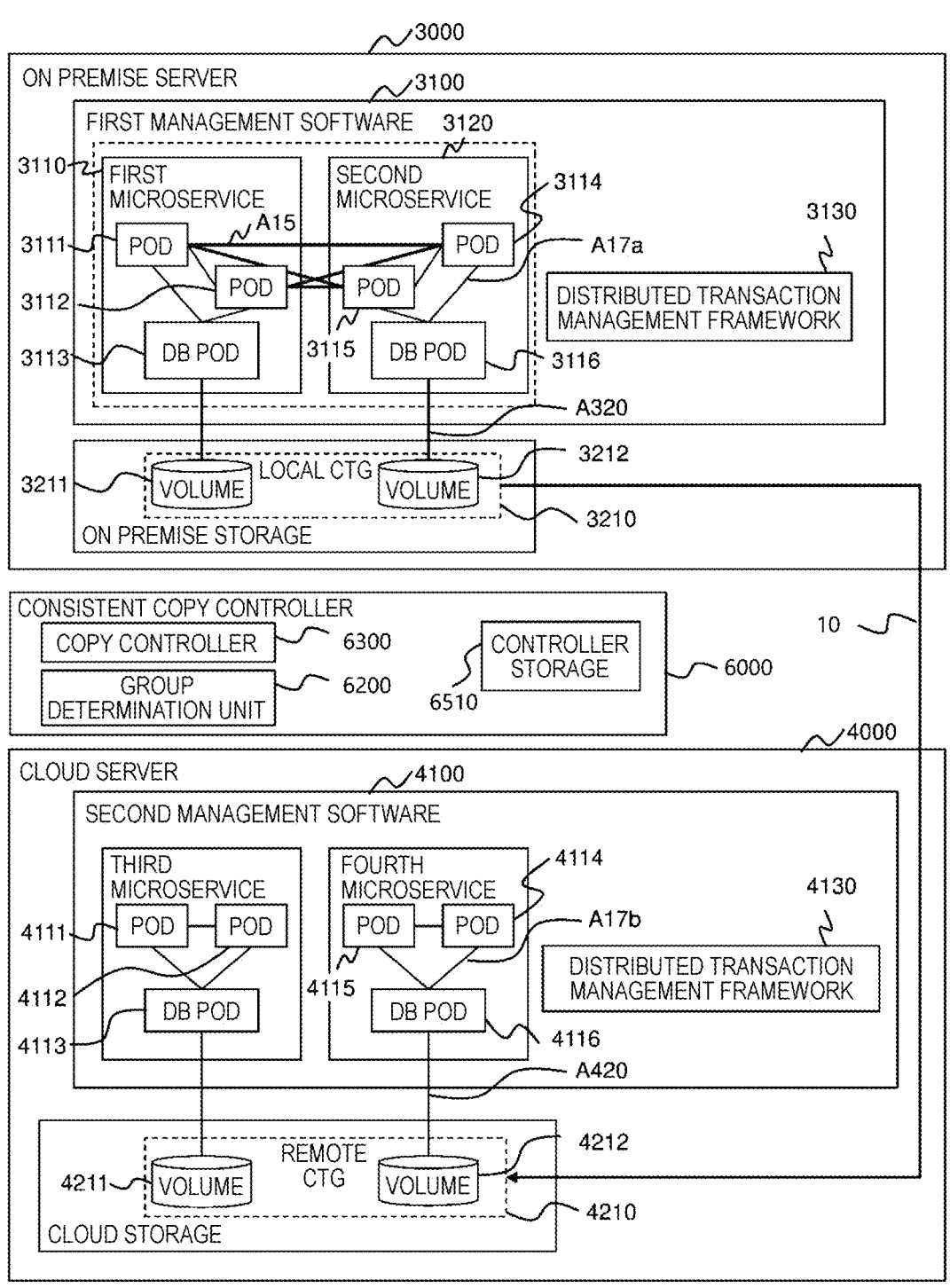
FIG. 1 is a diagram showing an overall configuration of a data synchronization system.

FIG. 1 is a diagram showing an overall configuration of a data synchronization system 1. The data synchronization system 1 includes an on premise server 3000, a cloud server 4000, and a consistent copy controller 6000. The consistent copy controller 6000 performs replication with a system on the on premise server 3000 as a replication source and a system on the cloud server 4000 as a replication destination. The on premise server 3000 and the cloud server 4000 have a so-called active-active configuration.

In the following, the on premise server 3000 is also referred to as a "local" and the cloud server 4000 is also referred to as a "remote". However, the on premise server 3000 and the cloud server 4000 are merely named as typical environments indicating different environments, and can also be referred to as a "first site" and a "second site". In addition, a physical distance between the first site and the second site does not matter, and they may be in the same server rack or may be separated by thousands or tens of thousands of km.

The on premise server 3000 includes first management software 3100 and an on premise storage 3200. The first management software 3100 is management software that operates in an on premise environment, and is also referred to as "orchestrator software" or an "orchestrator tool". For example, the first management software 3100 is Kubernetes or OpenShift. The first management software 3100 manages a plurality of microservices. In FIG. 1, the first management software 3100 operates a first microservice 3110 and a second microservice 3120, the first management software 3100 may manage three or more microservices. The first management software 3100 and the on premise storage 3200 support an API and respond to inquiries from, for example, the consistent copy controller 6000 via the API.

Each microservice is realized by one or more pods. The pod is a collection of one or more containers. Reference numerals 3111 to 3116 indicate a set of pods that execute applications on the on premise server 3000. Reference numerals 4111 to 4116 indicate a set of pods that execute applications on the cloud server 4000. In FIG. 1, the first microservice 3110 and the second microservice 3120 both include three pods, but the number of pods that realize each microservice may be different, and may be one or more. In this embodiment, a pod that manages a database (DB) is referred to as a "DB pod".

Since the DB pod performs reading and writing on a volume in which a database is stored, the DB pod is connected to any one of the volumes of the on premise storage 3200. In addition, it is not essential that the microservice includes a DB pod. However, the microservice managed by the first management software 3100 performs a distributed transaction. The first management software 3100 has a distributed transaction management framework 3130 that manages a distributed transaction in the on premise server 3000. The distributed transaction management framework 3130 tracks data flows and transactions.

The on premise storage 3200 is one or more non-volatile storage apparatuses, and virtualization technology may be applied thereto. The on premise storage 3200 includes a plurality of volumes. Some volumes included in the on premise storage 3200 form a local CTG 3210 by processing to be described below. "CTG" is an abbreviation for a ConsisTency Group. A plurality of local CTGs 3210 may be formed in the on premise storage 3200. Data stored in the on premise storage 3200 is set to be readable by the consistent copy controller 6000. Hereinafter, the local CTG 3210 is also referred to as a "first group".

In this embodiment, at least one distributed transaction is executed in the on premise server 3000. Thus, the on premise storage 3200 has at least two volumes. Since replication is performed on the cloud server 4000 from the on premise server 3000 as described above, and the same processing as that of the on premise server 3000 is performed, and thus at least one distributed transaction is executed in the cloud server 4000.

The cloud server 4000 includes second management software 4100 and a cloud storage 4200. The second management software 4100 is management software that operates in a cloud environment, and is the same type of software as the first management software 3100. The second management software 4100 manages one or more microservices. The second management software 4100 has a distributed transaction management framework 4130 that manages a distributed transaction in the cloud server 4000.

The cloud storage 4200 is one or more non-volatile storage apparatuses, and virtualization technology may be applied thereto. Cloud storage 4200 includes a plurality of volumes. Some volumes included in the cloud storage 4200 form a remote CTG 4210 by processing to be described below. A plurality of remote CTGs 4210 may be formed in the cloud storage 4200. Each volume of the cloud storage

4200 is set to be writable by the consistent copy controller 6000. Hereinafter, the remote CTG 4210 is also referred to as a "second group".

The consistent copy controller 6000 includes a group determination unit 6200, a copy controller 6300, and a controller storage 6510. The group determination unit 6200 determines a group of volumes (hereinafter, a "consistency group") for realizing a consistent copy in the on premises server 3000 and the cloud server 4000. The operation of the group determination unit 6200 will be described below in detail. The consistent copy controller 6000 can also be referred to as a "group generation apparatus" since it includes the group determination unit 6200 that determines a consistency group. Hereinafter, the copy controller 6300 will also be referred to as a "copy control unit".

The copy controller 6300 performs replication processing 10 from the on premises server 3000 to the cloud server 4000 for the consistency group determined by the group determination unit 6200. The controller storage 6510 is a non-volatile storage apparatus. The controller storage 6510 stores, in advance, source codes of all pods operating in the on premises server 3000 and the cloud server 4000. Furthermore, pods that are targets for write processing are directly described in the source codes. This can also be said to mean that write targets are hard-coded into the source codes.

Figure 2:
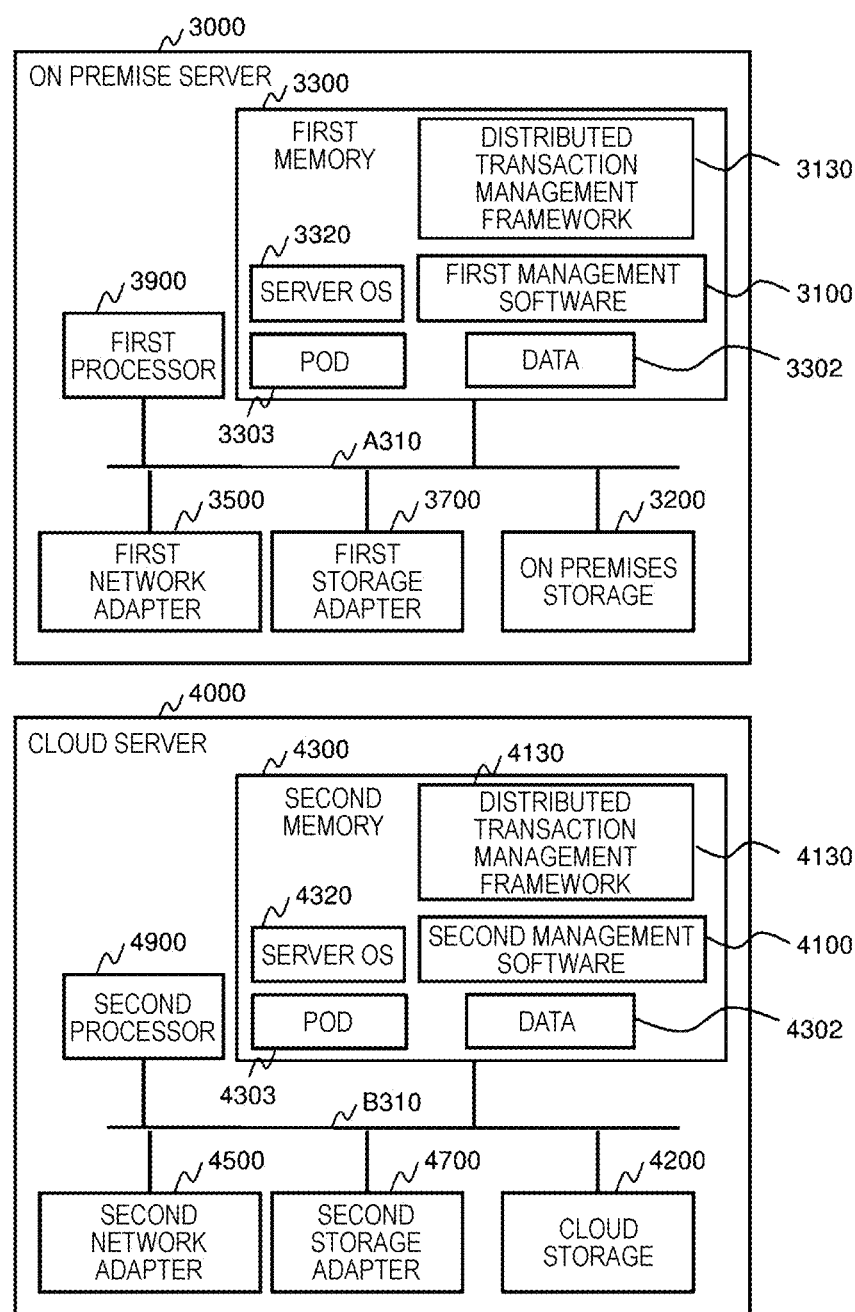
FIG. 2 is a diagram showing hardware configurations of an on premise server and a cloud server.

FIG. 2 is a diagram showing hardware configurations of the on premises server 3000 and the cloud server 4000. Although each of the on premises server 3000 and the cloud server 4000 are shown as a single apparatus in FIG. 2, each of the on premises server 3000 and the cloud server 4000 may be realized by a plurality of apparatuses. The on premises server 3000 includes a first processor 3900, a first memory 3300, and a first network adapter 3500, a first storage adapter 3700, and the on premises storage 3200 which are connected to each other via a communication bus 310. The first processor 3900 is a central processing unit. The first memory 3300 is a volatile memory that is readable and writable at high speed. The first network adapter 3500 is an apparatus that realizes communication with other apparatuses by the on premises server 3000, such as a network interface card. The first storage adapter 3700 mediates the input and output of data to and from the on premises storage 3200.

The first memory 3300 stores a server OS 3320, a pod 3303, a distributed transaction management framework 3130, first management software 3100, and data 3302. The server OS 3320 is an operation system that operates the on premises server 3000. The pod 3303 is a general term for the pods shown in FIG. 1. The distributed transaction management framework 3130 and the first management software 3100 are as described above. The data 3302 is a general term for data stored in the first memory 3300, and is input and output to and from the on-press storage 3200. The program stored in the first memory 3300 is a program in which the first processor 3900 expands a program stored in a ROM (not shown).

The cloud server 4000 includes a second processor 4900, a second memory 4300, a second network adapter 4500, a second storage adapter 4700, and a cloud storage 4200 which are connected to each other via a communication bus 410. The second processor 4900 is a central processing unit. The second memory 430 is a volatile memory that is readable and writable at high speed. The second network adapter 4500 is an apparatus that realizes communication with other apparatuses by the cloud server 4000, such as a network interface card. The second storage adapter 4700 mediates the input and output of data to and from the cloud storage 4200.

The second memory 4300 stores a server OS 4320, a pod 4303, a distributed transaction management framework 4130, second management software 4100, and data 4302. The server OS 4320 is an operation system that operates the cloud server 4000. The pod 4303 is a general term for the pods shown in FIG. 1. The distributed transaction management framework 4130 and the second management software 4100 are as described above. The data 4302 is a general term for data stored in the second memory 4300, and is input and output to and from the cloud storage 4200. The program stored in the second memory 4300 is a program in which the second processor 4900 expands a program stored in a ROM (not shown).

Figure 3:
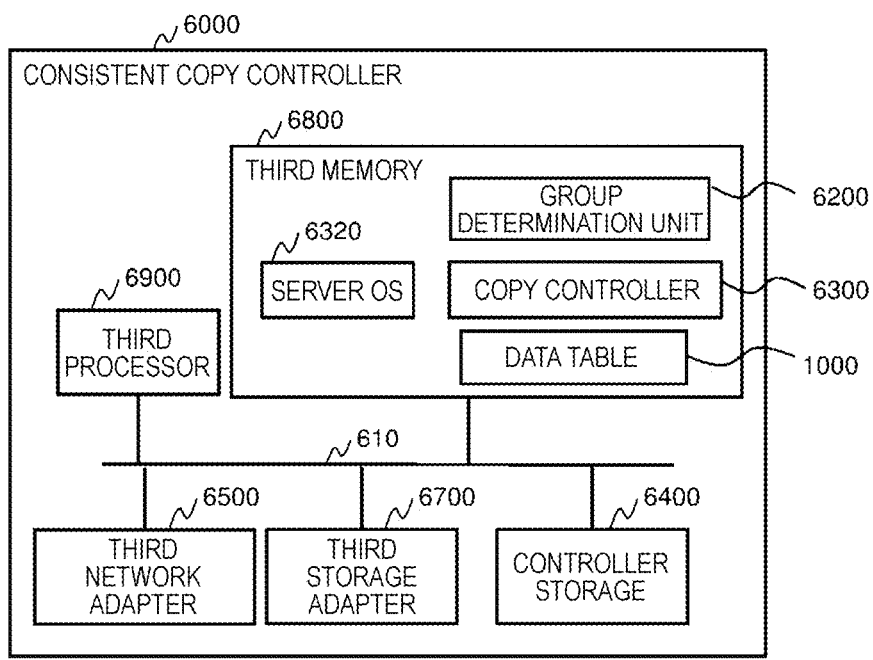
FIG. 3 is a diagram showing a hardware configuration of a consistent copy controller.

FIG. 3 is a diagram showing a hardware configuration of the consistent copy controller 6000. The consistent copy controller 6000 includes a third processor 6900, a third memory 6800, a third network adapter 6500, a third storage adapter 6700, and a controller storage 6400 which are connected to each other via a communication bus 610. The third processor 6900 is a central processing unit. The third memory 6800 is a volatile memory that is readable and writable at high speed. The third network adapter 6500 is an apparatus that realizes communication with other apparatuses by the consistent copy controller 6000, such as a network interface card. The third storage adapter 6700 mediates the input and output of data to and from the controller storage 6400.

The third memory 6800 stores a server OS 6320, a group determination unit 6200, a copy controller 6300, and a data table 1000. The server OS 6320 is an operation system that operates the consistent copy controller 6000. The data table 1000 stores data created by the group determination unit 6200.

FIG. 4 is a diagram showing an example of a distributed transaction set list 1100, a volume service relationship list 1200, and a distributed transaction graph 1300 included in the data table 1000.

The distributed transaction set list 1100 shows a relationship between a transaction ID 1110, a service ID 1120, and a location 1130. The transaction ID 1110 is an identifier of a distributed transaction. The service ID 1120 is an identifier of a service. The location 1130 indicates whether a location where a service is executed is "local" or "remote". In this embodiment, an identifier of a distributed transaction is expressed by a combination of "T" and a number, and an identifier of a service is expressed by a combination of "S" and a number.

The volume service relationship list 1200 shows a relationship between a service name 1210, a service ID 1220, a volume connection destination 1230, a location 1240, and a pod ID 1250. The service name 1210 is the name of the service. The service ID 1220 is an identifier of the service, and is the same as the service ID 1120 of the distributed transaction set list 1100. The volume connection destination 1230 is an identifier of a volume that is a write destination in the corresponding service. The location 1240 indicates whether the location where the service is executed is "local" or "remote". The pod ID 1250 is an identifier of a pod that executes write processing. In this embodiment, a service name is expressed as a combination of "MS" and a number, a volume is expressed as a combination of "V" and a number, and an identifier of a pod is expressed as a combination of "P" and a number.

The distributed transaction graph 1300 shows a relationship between a graph ID 1310, a node ID 1320, a position 1330, a pod ID 1340, and a service ID 1350. The graph ID 1310 is an identifier of an undirected graph indicating a series of distributed transactions. In this embodiment, an identifier of an undirected graph is expressed as a combination of "G" and a number, and an identifier of a node is expressed as a combination of "N" and a number. The node ID 1320 is an identifier of a node constituting an undirected graph.

The position 1330 is the same as the location 1130 in the distributed transaction set list 1100 or the location 1240 in the volume service relationship list 1200. The pod ID 1340 is the same as the pod ID 1250 in the volume service relationship list 1200. The service ID 1350 is an identifier of a service, and is the same as the service ID 1120 in the distributed transaction set list 1100 or the service ID 1220 in the volume service relationship list 1200.

Figure 5:
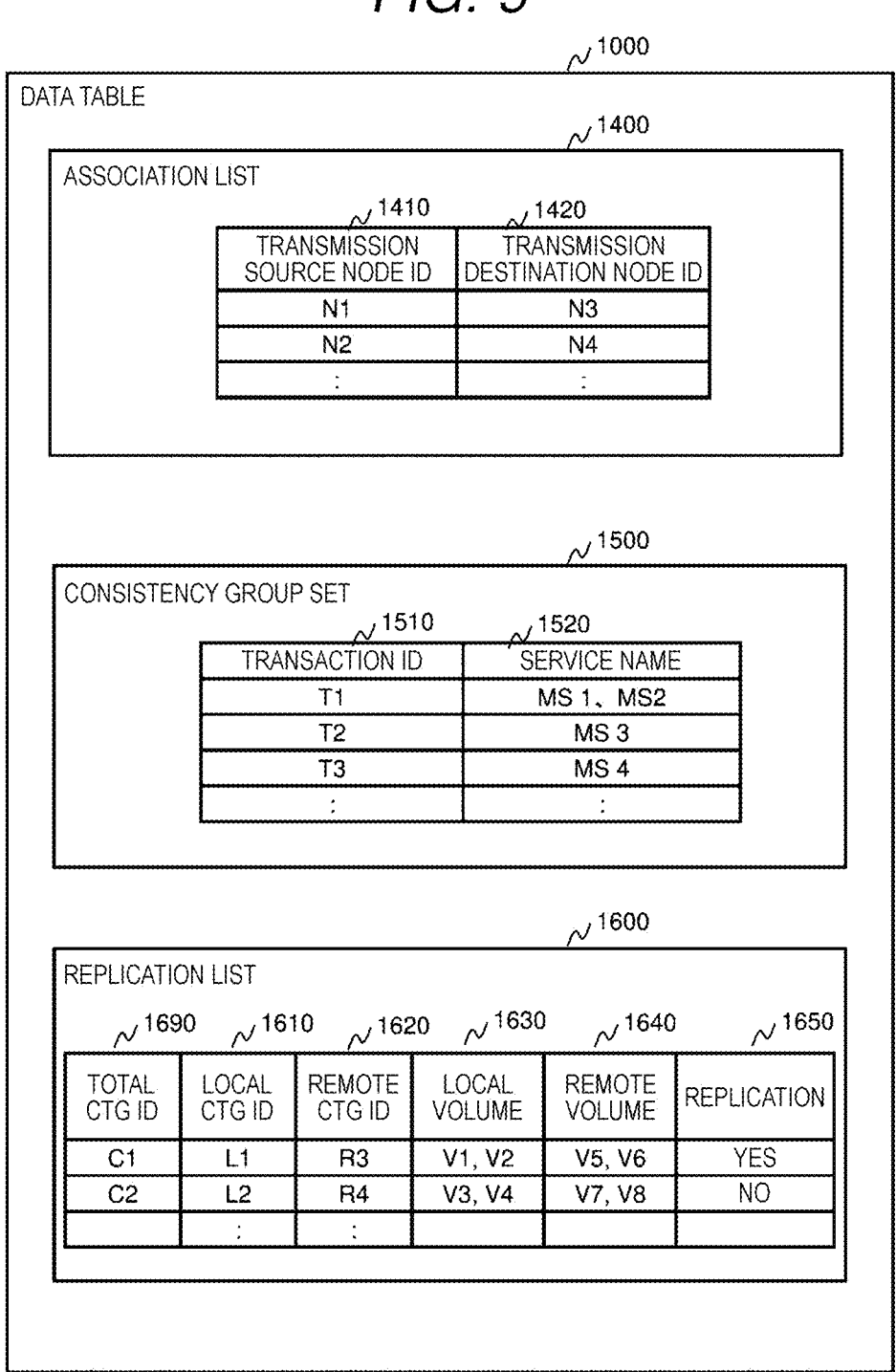
FIG. 5 is a diagram showing an example of a related list, a consistency group set, and a replication list included in a data table.

FIG. 5 is a diagram showing an example of an association list 1400, a consistency group set 1500, and a replication list 1600 included in the data table 1000.

The association list 1400 shows a relationship between a transmission source node ID 1410 and a transmission destination node ID 1420. The transmission source node ID 1410 is an identifier of a node that is a transmission source of data in a distributed transaction. The transmission destination node ID 1420 is an identifier of a node that is a transmission destination of data in a distributed transaction. The transmission source node ID 1410 and the transmission destination node ID 1420 are the same as the node ID 1320 in the distributed transaction graph 1300.

The consistency group set 1500 shows a relationship between a transaction ID 1510 and a service name 1520. The transaction ID 1510 is an identifier of a distributed transaction, and is the same as the transaction ID 1110 in the distributed transaction set list 1100. The service name 1520 is the name of a service, and is the same as the service name 1210 in the volume service relationship list 1200.

The replication list 1600 shows a relationship between a CTG ID 1690, a local CTG ID 1610, a remote CTG ID 1620, a local volume 1630, a remote volume 1640, and a replication 1650. The CTG ID 1690 is an identifier of a total CTG, which is a combination of a local CTG and a remote CTG. The local CTG ID 1610 is an identifier of a local CTG. The remote CTG ID 1620 is an identifier of a remote CTG.

In this embodiment, the identifier of the total CTG is expressed as a combination of "C" and a number, the identifier of the local CTG is expressed as a combination of "L" and a number, and the identifier of the remote CTG is expressed as a combination of "R" and a number. The local volume 1630 is an identifier of a volume belonging to the local CTG. The remote volume 1640 is an identifier of a volume belonging to the remote CTG. The replication 1650 indicates whether replication is required as designated by a user, and is either "yes" or "no".

Figure 6:
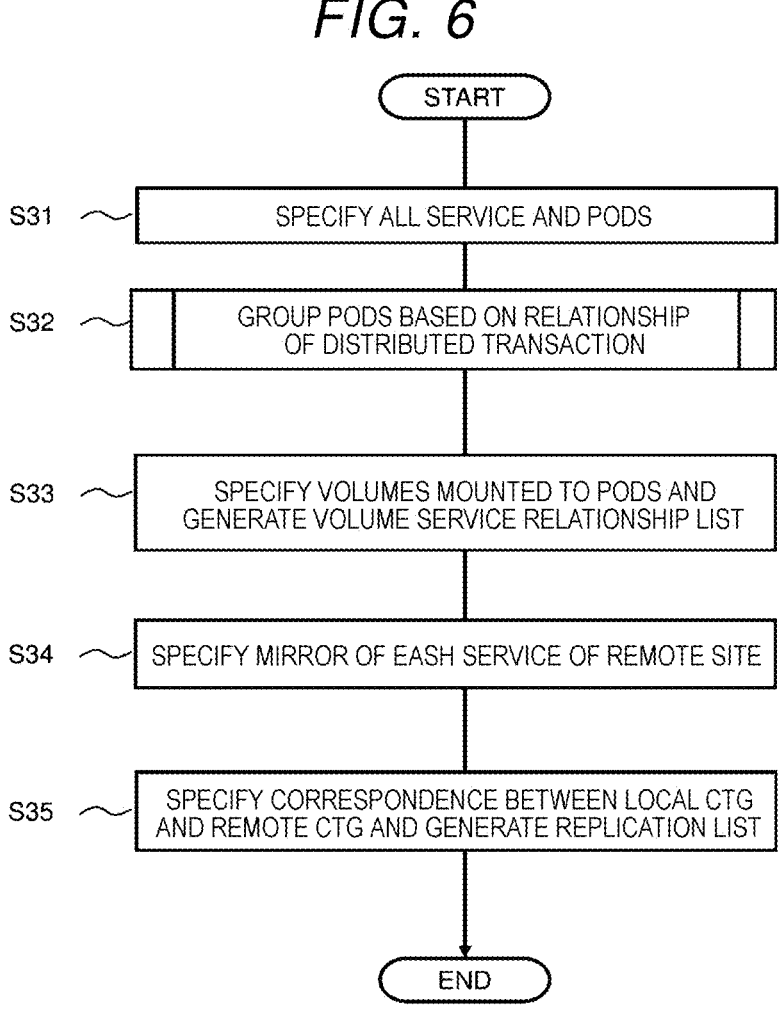
FIG. 6 is a flowchart showing processing of a group determination unit.

FIG. 6 is a flowchart showing processing of the group determination unit 6200. First, in step S31, the group determination unit 6200 specifies all services and pods using the first management software 3100 and the second management software 4100.

Figure 7:
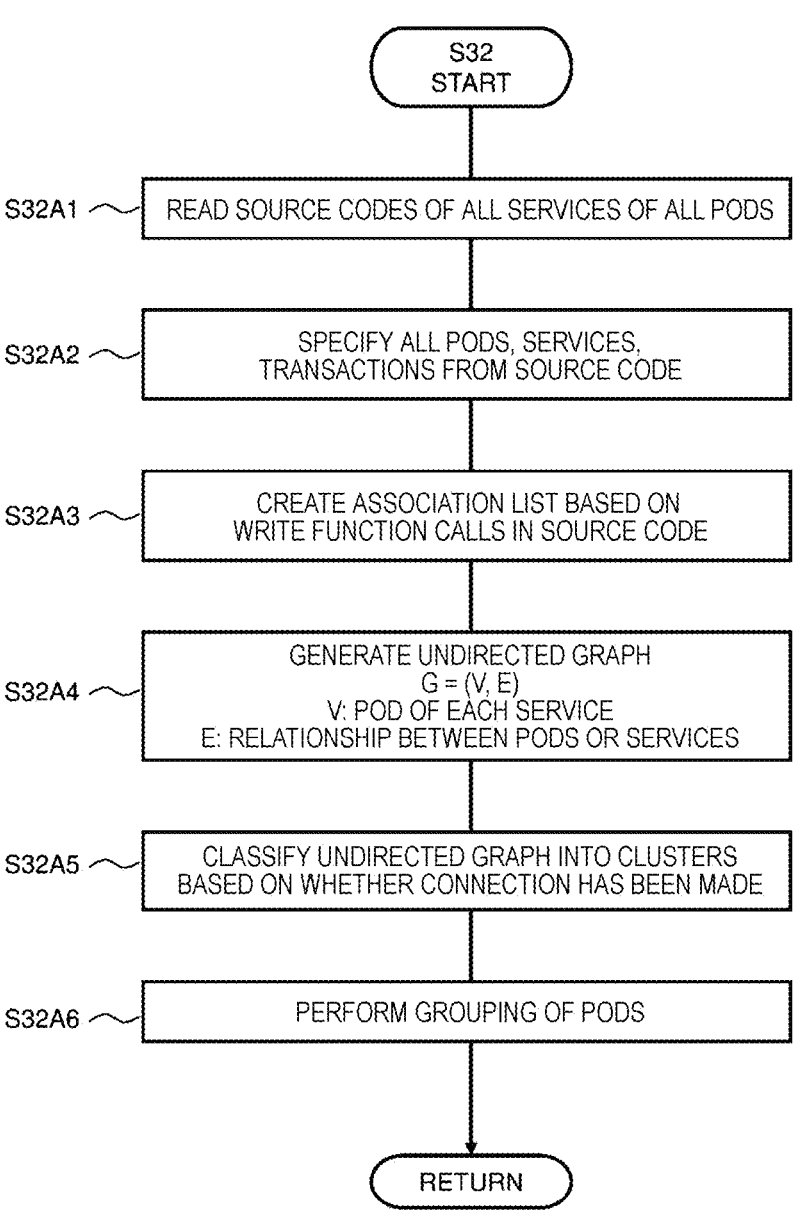
FIG. 7 is a flowchart showing detailed processing when analyzing a source code in step S32 of FIG. 6.

In the subsequent step S32, the group determination unit 6200 determines the grouping of pods at each of a local site and a remote site, that is, determines either the local CTG or the remote CTG, based on the relationship of the distributed transaction. Specifically, the group determination unit 6200 acquires the relationship of the distributed transaction by analyzing source codes or using an API. Further, in this step, a correspondence relationship between a pod and a services is also clarified. Details of the processing of this step will be described later in detail with reference to FIG. 7 showing a case where a source code is analyzed and FIG. 9 showing a case where an API is used. Which of the processing shown in FIG. 7 or the processing shown in FIG. 9 is executed by the group determination unit 6200 may be set in advance, or may be designated by a user each time the processing is executed. In addition, one processing that is set in advance may be executed first, and the other processing may be executed when the one processing cannot be completed normally.

In the subsequent step S33, the group determination unit 6200 specifies volumes mounted to pods, and generates the volume service relationship list 1200. Specifically, the group determination unit 6200 specifies the volumes mounted to the pods using APIs provided by the first management software 3100 and the second management software 4100. In the subsequent step S34, the group determination unit 6200 specifies a correspondence relationship between local and remote services. The correspondence relationship between service IDs and service names may be created in advance by a user or the like, or the group determination unit 6200 may specify the correspondence relationship with services based on matching of service names.

In the subsequent step S35, the group determination unit 6200 specifies correspondence between the local CTG and the remote CTG, generates the replication list 1600, and ends the processing shown in FIG. 6. Specifically, the group determination unit 6200 first converts the group of the pods specified in step S32 into a group of volumes using the volume service relationship list 1200 generated in step S33. Next, the group determination unit 6200 clarifies correspondence relationship between a group of local volumes and a group of remote volumes from the result of step S34. Then, the group determination unit 6200 writes the clarified correspondence into the replication list 1600. However, at this stage, no instruction has been received from the user regarding the replication 1650 indicating whether replication processing is required. Here, the group determination unit 6200 may inquire of the user whether replication is required, or may subject all to replication processing. When the processing shown in FIG. 6 is completed, it is possible to perform replication processing by the copy controller 6300.

FIG. 7 is a flowchart showing detailed processing when analyzing a source code in step S32. In step S32A1, the group determination unit 6200 reads source codes related to all services in all local and remote pods. In the subsequent step S32A2, the group determination unit 6200 analyzes the source codes to specify all pods, all services, and all distributed transactions.

In the subsequent step S32A3, the group determination unit 6200 specifies a relationship of all distributed transactions and creates the association list 1400 with reference to the write function calls in the source code. Specifically, the group determination unit 6200 searches for the description of the write function in the source code to specify transmission source pods and transmission destination pods in all writes between pods or services in each of the distributed transactions. Then, each of the pods is replaced with a node to create the association list 1400. In addition, a correspondence relationship between the pods and the nodes is written to the distributed transaction graph 1300. However, at a point in time when the processing of this step is completed, the column of the graph ID 1310 in the distributed transaction graph 1300 is blank.

In the subsequent step S32A4, the group determination unit 6200 generates an undirected graph. In this undirected graph, a vertex V is a pod of each service, and an edge E is a write relationship between the pods. For example, the undirected graph can be generated by disposing all of the pods specified in step S32A2 as vertices and creating edges connecting the vertices based on the association list 1400 created in step S32A3.

Figure 8:
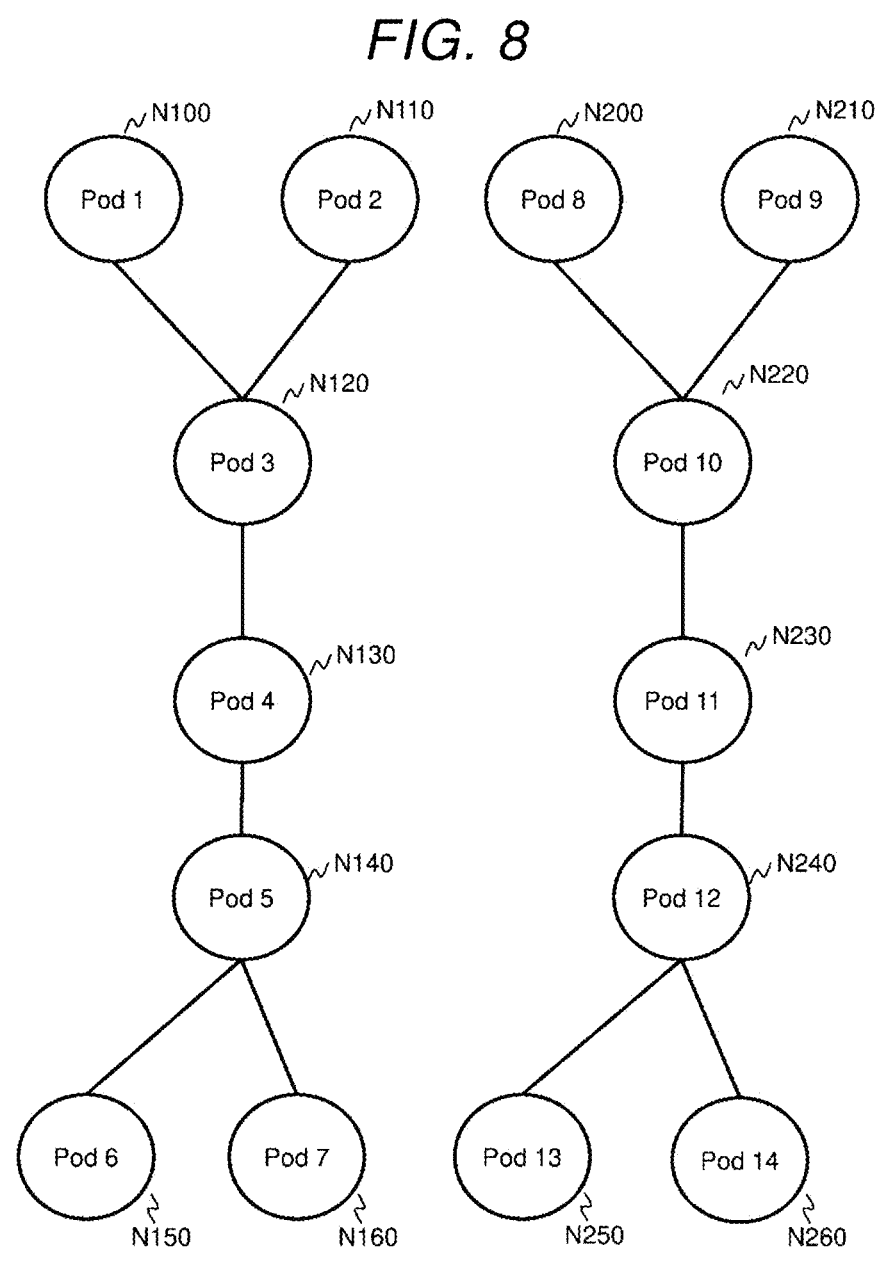

FIG. 8 is a diagram showing an example of an undirected graph created in step S32A4. This diagram does not correspond to FIG. 1, FIG. 4, FIG. 5, and the like. In FIG. 8, Pod 1, Pod 2, and Pod 4 are connected to Pod 3. In this undirected graph, there is no distinction between a pod that performs write and a pod that is written to, but it is indicated that Pod3 is in a write relationship with Pod 1, Pod 2, and Pod 4.

In the subsequent step S34A5, the group determination unit 6200 classifies the undirected graph generated in step S32A4 into clusters based on whether connection has been made. Specifically, a set of nodes connected by edges is set as one cluster, nodes not connected by edges are classified as different clusters, and pods are grouped. For example, in the example of the undirected graph shown in FIG. 8, Pod 1 to Pod 7 form one cluster, and Pod 8 to Pod 14 form another cluster. A distributed transaction is performed in each of a local and a remote, and there is no distributed transaction that spans a local and a remote, and thus the undirected graph is classified into at least two clusters in this step.

In the subsequent step S32A6, the group determination unit 6200 groups the pods based on the cluster classification performed in step S34A5. Specifically, the group determination unit 6200 assigns a graph ID to each cluster obtained by the classification performed in step S34A5, and writes in the graph ID in the graph ID 1310 of the distributed transaction graph 1300. It is indicated that pods to which the same graph ID is assigned in the distributed transaction graph 1300 belong to the same group. As described above, since distributed transaction processing is not performed between local pods and remote pods, the local pods and the remote pods necessarily belong to different groups. The local CTG 3210 described above is a group of local pods. The remote CTG 4210 described above is a group of remote pods.

FIG. 9 is a flowchart showing detailed processing when an API is used in step S32. In the subsequent step S32B1, the group determination unit 6200 specifies all pods and services using APIs of the distributed transaction management framework 3130 and the distributed transaction management framework 4130.

In the subsequent step S32B2, the group determination unit 6200 specifies a relationship of all distributed transactions using the API to create the association list 1400. Specifically, the group determination unit 6200 specifies transmission source pods and transmission destination pods in all writes between pods or services in each of the distributed transactions by using the API. Then, each of the pods is replaced with a node to create the association list 1400. In addition, a correspondence relationship between the pods and the nodes is written to the distributed transaction graph 1300. However, at a point in time when the processing of this step is completed, the column of the graph ID 1310 in the distributed transaction graph 1300 is blank. The processes of the write steps of steps S32B3 to S32B5 are the same as those of steps S32A4 to S32A6, and thus the description thereof will be omitted. The above is the description of the flowchart shown in FIG. 9.

Figure 10:
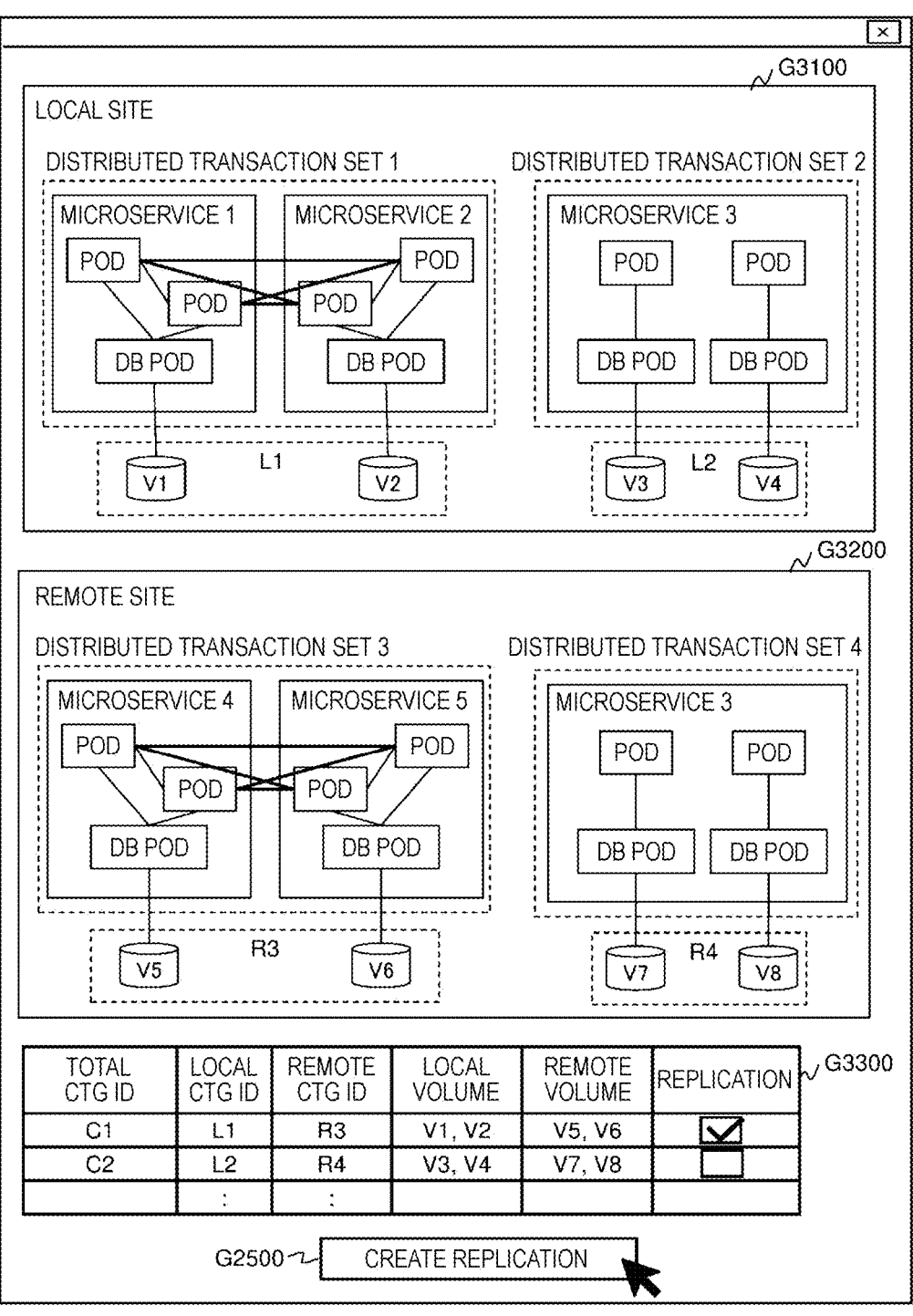
FIG. 10 is a diagram showing an example of a user interface.

FIG. 10 is a diagram showing an example of a user interface. The copy controller 6300 provides a user interface to a user via the third network adapter 6500. FIG. 10 shows a CTG group calculated by the group determination unit 6200. Reference numerals G3100 and G3200 in FIG. 10 indicate that there are two local CTGs, "L1" and "L2", and two remote CTGs, "R3" and "R4". A total CTG "C1" includes the local CTG "L1" and the remote CTG "R3", and a total CTG "C2" includes the local CTG "L2" and the remote CTG "R4". In the replication list 1600 denoted by reference numeral G3300, only the rightmost column for whether replication is required is displayed as a check box that can be set by a user.

After the user enters a check in the check box, the user can press a "Create Replication" button denoted by Reference numeral G2500 at a lower portion shown in the drawing to cause the copy controller 6300 to execute replication processing. In the example shown in FIG. 10, replication processing is performed for the total CTG "C1", but replication processing is not performed for the total CTG "C2".

According to the first embodiment described above, the following effects can be obtained.

(1) The consistent copy controller 6000, which can also be referred to as a group generation apparatus, determines a total CTG for providing consistency to replication processing from the on premise server 3000 including a plurality of volumes to the cloud server 4000 including a plurality of volumes. The consistent copy controller 6000 includes the group determination unit 6200 that performs the following processing. The group determination unit 6200 forms one or more local CTGs 3210, which are groups of volumes in the on premise server 3000, based on the relationship of the distributed transactions in the on premise server 3000, and forms one or more remote CTGs 4210, which are groups of volumes in the cloud server 4000, based on the relationship of the distributed transactions in the cloud server 4000 (S32 in FIG. 6). Furthermore, the group determination unit 6200 specifies the correspondence relationship between the local CTG 3210 and the remote CTG 4210 (S34 in FIG. 6), and includes the local CTG 3210 and the remote CTG 4210 corresponding to each other based on the specified correspondence relationship in the same total CTG (S35 in FIG. 6).

(2) The group determination unit 6200 creates an undirected graph in which a pod is a vertex and a write relationship for a volume is an edge (S32A4 in FIG. 7, S32B3 in FIG. 8), and classifies undirected graphs that are not in a connection relationship as different local CTGs 3210 (S32A6 in FIG. 7, S32B5 in FIG. 8).

(3) The group determination unit 6200 specifies a relationship of distributed transactions by analyzing a source code (S32A1 in FIG. 7). For this reason, it is possible to specify the relationship of the distributed transactions without relying on an API such as the distributed transaction management framework 3130.

(4) Distributed transactions are managed by the distributed transaction management framework 3130 and the distributed transaction management framework 4130. The group determination unit 6200 specifies the relationship of the distributed transactions by using the APIs of the distributed transaction management framework 3130 and the distributed transaction management framework 4130 (S32B1 in FIG. 8).

(5) The consistent copy controller 6000 includes the copy controller 6300 that presents the consistency groups set by the group determination unit 6200 and provides a user interface that receives a user's designation of whether replication is required.

(6) The consistent copy controller 6000 includes the copy controller 6300 that executes replication processing for the total CTG.

Modification Example 1

In the first embodiment described above, the group determination unit 6200 is included in the consistent copy controller 6000. However, the group determination unit 6200 may be included in the on premise server 3000 or the cloud server 4000, or may be mounted to another apparatus. That is, the group determination unit 6200 may be mounted to a computing apparatus that has previously acquired a source code of pods operating in the on premise server 3000 and the cloud server 4000, or to a computing apparatus that can inquire of the on premise server 3000 and the cloud server 4000, and the group determination unit 6200 may output a calculation result to the consistent copy controller 6000, thereby realizing consistent replication as in the first embodiment.

Modification Example 2

The controller storage 6510 of the consistent copy controller 6000 stores source codes of all pods operating in the on premise server 3000 and the cloud server 4000 in advance. However, when the group determination unit 6200 uses an API at all times, the consistent copy controller 6000 does not need to include the controller storage 6510.

Modification Example 3

The distributed transaction management framework 3130 and the distributed transaction management framework 4130 do not need to be provided.

Modification Example 4

In the above-described embodiment, the formation of a consistency group for realizing a consistent copy in replication from the on premise server 3000 to the cloud server 4000 has been described. However, the configuration in which a replication source is a local and a replication destination is a remote is merely an example, and the reverse relationship may be used, or both may be remotes or locals.

Modification Example 5

In the embodiment described above, a pod to be written to is hard-coded in a source code stored in the consistent copy controller 6000. However, a pod to be written to may be specified by a combination of a source code and a setting file (not shown).

Modification Example 6

The copy controller 6300 may not provide a user interface. For example, the copy controller 6300 may subject all total CTGs set by the group determination unit 6200 to replication processing without inquiring of a user.

In the above-described embodiments and modification examples, the configuration of the functional blocks is merely an example. Some functional configurations shown as separate functional blocks may be configured integrally, or a configuration shown in one functional block diagram may be divided into two or more functions. In addition, a configuration in which some of the functions of functional blocks are provided by other functional blocks may be adopted.

In the above-described embodiments and modification examples, the program is stored in the ROM (not shown), but the program may be stored in a rewritable non-volatile apparatus. The on premise server 3000 or the cloud server 4000 may include an input/output interface (not shown), and the program may be read from another apparatus via the input/output interface and a medium that can be used by the on premise server 3000 or the cloud server 4000 when necessary. Here, the medium is, for example, a storage medium that is detachable from the input/output interface, or a communication medium, that is, a wired, wireless, or optical network, or a carrier wave or digital signal that propagates through the network. In addition, some or all of the functions realized by the program may be realized by a hardware circuit or an FPGA.

The above-described embodiments and modification examples may be combined with each other. Although various embodiments and modification examples have been described above, the invention is not limited thereto. Other aspects that are conceivable within the scope of the technical idea of the invention are also included in the scope of the invention.

What is claimed is:

1. A group generation apparatus that determines a consistency group for providing consistency to replication processing from a first site including a plurality of volumes to a second site including a plurality of volumes, the group generation apparatus comprising:

a group determination unit that forms one or more first groups that are groups of volumes at the first site based on a relationship of distributed transactions at the first site, forms one or more second groups that are groups of volumes at the second site based on a relationship of distributed transactions at the second site, specifies a correspondence relationship between the first group and the second group, and includes the first group and the second group that correspond to each other based on the specified correspondence relationship in the same consistency group, wherein the group determination unit creates undirected graphs in which a pod is a vertex and a write relationship for a volume is an edge, and classifies the undirected graphs that are not in a connection relationship into different first groups, the pod is connected to the volume, or the pod performs writing to another pod connected to the volume, and in order to create the undirected graphs, the group determination unit:

reads source code related to all services in all local and remote pods, the source code storing write function calls regarding pods that are targets for write processing:

analyzes the source code to specify all pods, all services, and all distributed transactions; and specifies a relationship of all distributed transactions and creates an association list with reference to the write function calls in the source code by searching for descriptions of the write function calls in the source code to specify transmission source pods and transmission destination pods in all writes between pods or services in each of the distributed transactions.

2. The group generation apparatus according to claim 1, further comprising a copy control unit that presents the consistency group set by the group determination unit and provides a user interface that receives a user's designation of whether replication is required.

3. The group generation apparatus according to claim 1, further comprising a copy control unit that executes replication processing for the consistency group.

4. A group determination method of determining a consistency group for providing consistency to replication processing from a first site including a plurality of volumes to a second site including a plurality of volumes, the group generation method comprising:

forming one or more first groups that are groups of volumes at the first site based on a relationship of distributed transactions at the first site;

forming one or more second groups that are groups of volumes at the second site based on a relationship of distributed transactions at the second site;

specifying a correspondence relationship between the first group and the second group;

including the first group and the second group that correspond to each other based on the specified correspondence relationship in the same consistency group; and creating undirected graphs in which a pod is a vertex and a write relationship for a volume is an edge, and classifying the undirected graphs that are not in a connection relationship into different first groups, wherein the pod is connected to the volume, or the pod performs writing to another pod connected to the volume, wherein in order to create the undirected graphs:

reading source code related to all services in all local and remote pods, the source code storing write function calls regarding pods that are targets for write processing;

analyzing the source code to specify all pods, all services, and all distributed transactions; and specifying a relationship of all distributed transactions and creating an association list with reference to the write function calls in the source code by searching for descriptions of the write function calls in the source code to specify transmission source pods and transmission destination pods in all writes between pods or services in each of the distributed transactions.

* * * * *